US006925661B1

(12) United States Patent
Anger

(10) Patent No.: US 6,925,661 B1
(45) Date of Patent: Aug. 9, 2005

(54) BATHTUB/SHOWER WATER CONTROL SYSTEM

(76) Inventor: Al T. Anger, 630 McPhearson La., Hueytown, AL (US) 35023

( * ) Notice: Subject to any disclaimer, the term of this patent is extended or adjusted under 35 U.S.C. 154(b) by 62 days.

(21) Appl. No.: 10/448,375

(22) Filed: May 30, 2003

(51) Int. Cl.[7] .................................................. A47K 3/00
(52) U.S. Cl. ................................ 4/559; 4/545; 4/541.2
(58) Field of Search .............................. 4/541.1–541.6, 4/545, 601, 602, 603, 559, 584

(56) References Cited

U.S. PATENT DOCUMENTS

| 3,571,818 A | | 3/1971 | Jacuzzi |
|---|---|---|---|
| 4,682,728 A | | 7/1987 | Oudenhoven et al. |
| 4,696,428 A | | 9/1987 | Shakalis |
| 4,756,030 A | * | 7/1988 | Juliver ........................ 4/668 |
| 4,872,224 A | | 10/1989 | Grimes et al. |
| 5,079,784 A | | 1/1992 | Rist et al. |
| 5,206,963 A | * | 5/1993 | Wiens ........................... 4/603 |
| 5,245,221 A | | 9/1993 | Schmidt et al. |
| D363,060 S | | 10/1995 | Hunger et al. |
| 5,559,720 A | | 9/1996 | Tompkins et al. |
| 5,829,069 A | | 11/1998 | Morgan et al. |
| 6,317,717 B1 | * | 11/2001 | Lindsey et al. ................ 4/623 |
| D453,835 S | | 2/2002 | Jacuzzi et al. |
| 6,625,029 B2 | * | 9/2003 | Bernini ...................... 361/728 |
| 2004/0154094 A1 | * | 8/2004 | Ostrowski et al. ........... 4/541.1 |

* cited by examiner

Primary Examiner—Khoa D. Huynh

(57) ABSTRACT

A water control system includes a control panel connected to a power source and is mountable adjacent to a bathtub. The system further includes a plurality of sensors connected to the control panel for determining water temperature and water flow rate wherein the plurality of sensors are selectively connected to a plurality of water supply lines. The water control system further includes a plurality of valves connected to the control panel for regulating water flow wherein the plurality of valves are selectively connected to a plurality of water supply lines. The water control system further includes at least one heating device fluidly connected to a water source for regulating water temperature. The control panel may be programmable for selectively operating the plurality of valves and the at least one heating device.

9 Claims, 3 Drawing Sheets

BATHTUB/SHOWER WATER CONTROL SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a water control system and, more particularly, to a bathtub/shower water control system including a control panel for automatically controlling the flow and temperature of water.

2. Prior Art

Many methods and apparatus for the mixing and control of fluids are known. The device with which people most often come in contact is the conventional faucet or shower arrangement, wherein the temperature and volume flow rate of the effluent water are controlled through independent, manual adjustment of knobs mechanically coupled to ball valves in the hot water line and cold water line, respectively. The procedure of turning on both valves, adjusting for a desired volume flow rate, holding one's hand in the stream to sense temperature, and readjusting the knobs to obtain a desired temperature while maintaining the desired volume is so often carried out as to become reflexive. Nevertheless, the procedure can be time consuming, and a scalded hand as a result of water which is initially too hot or which is unintentionally adjusted to become too hot can be a major annoyance if not an outright hazard.

Moreover, swings in temperature due to additional demands on the water system are a familiar occurrence. In the past, however, it has been necessary simply to tolerate these changes in temperature, or to continually manipulate the hot and cold water knobs to compensate for these undesirable changes.

Accordingly, a need exists for a system to automatically control temperature and water flow at desired settings.

BRIEF SUMMARY OF THE INVENTION

In view of the foregoing background, it is therefore an object of the present invention to provide a bathtub/shower water control system. These and other objects, features, and advantages of the present invention are provided by a water control system for use with a bathtub including a plurality of water dispensers and a plurality of water supply lines. The water control system includes a control panel connected to a power source and is mountable adjacent to a bathtub. The system further includes a plurality of sensors connected to the control panel for determining water temperature and water flow rate. The plurality of sensors are selectively connected to the plurality of water supply lines.

The water control system further includes a plurality of valves connected to the control panel for regulating water flow wherein the plurality of valves are selectively connected to a plurality of water supply lines. The water control system further includes at least one heating device fluidly connected to a water source for regulating water temperature. The at least one heating device receives water having a first temperature and delivers water having a second temperature to a bathtub. At least one heating device may be disposed adjacent a bathtub.

The control panel may be programmable for selectively operating the plurality of valves and the at least one heating device. The control panel may further include a display screen. The control panel may further include means for selectively programming water temperature and water pressure to a desired level. The control panel may further include means for automatically regulating water temperature and water pressure.

The water control system may further include an automatic drain plug connected to the control panel. The control panel preferably includes a keypad for selectively operating the drain plug. The keypad may also selectively control water temperature and water pressure being supplied to a bathtub. The control panel preferably includes a plurality of buttons for selectively controlling a shower head having a plurality of water dispensing modes.

One of the plurality of sensors is preferably located upstream of a water tank. The one sensor may provide an input signal to the control panel for indicating water temperature and water flow rate. A water tank preferably includes a hot water supply line and a cold water supply line. Each of the hot and cold water supply lines preferably have a corresponding one of the plurality of valves connected thereto. Another one of the plurality of sensors is preferably connected to the hot water supply line and is preferably located upstream of the hot water supply line valve.

One of the plurality of sensors may be located upstream a shower head. In addition, one of the plurality of sensors may be located downstream of a shower head and upstream of the bath faucet for regulating the water temperature supplied to the bath faucet.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout, and prime and double prime notations are used to indicate similar elements in alternate embodiments.

Figure 1:
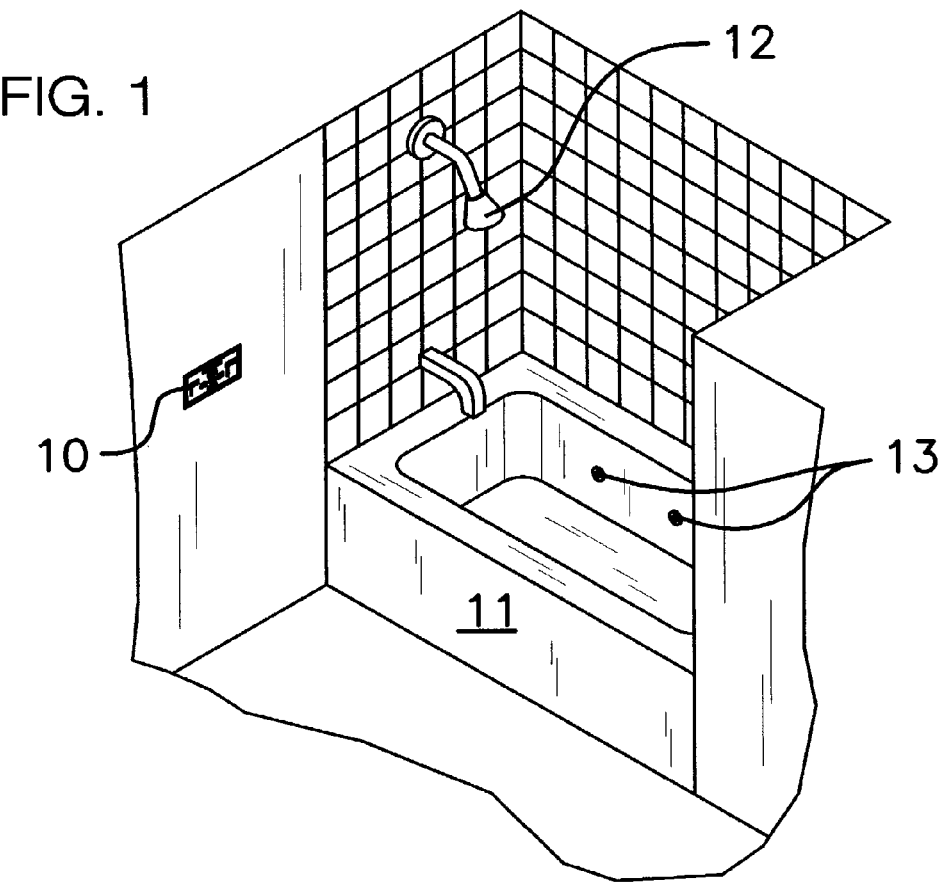
FIG. 1 is a perspective view showing a control panel of the water control system mounted adjacent to a bathtub/shower, in accordance with the present invention.

The control pad of the present invention is referred to generally in FIG. 1 by the reference numeral 10 and is intended to control the water temperature and flow rate leading to a bathtub 11 shower head 12. It should be understood that the present invention may be used to operate various types of bathtubs/showers and should not be construed as being limited to a whirlpool bathtub/shower, as shown. The control pad 10 is preferably water proof and mountable to a wall, for example, as clearly shown. The conventional bathtub 11 may have a plurality of water dispensers or water jets 13 and the conventional shower head 12 may have multiple operating modes as readily known to a person of ordinary skill in the art.

Figure 2:
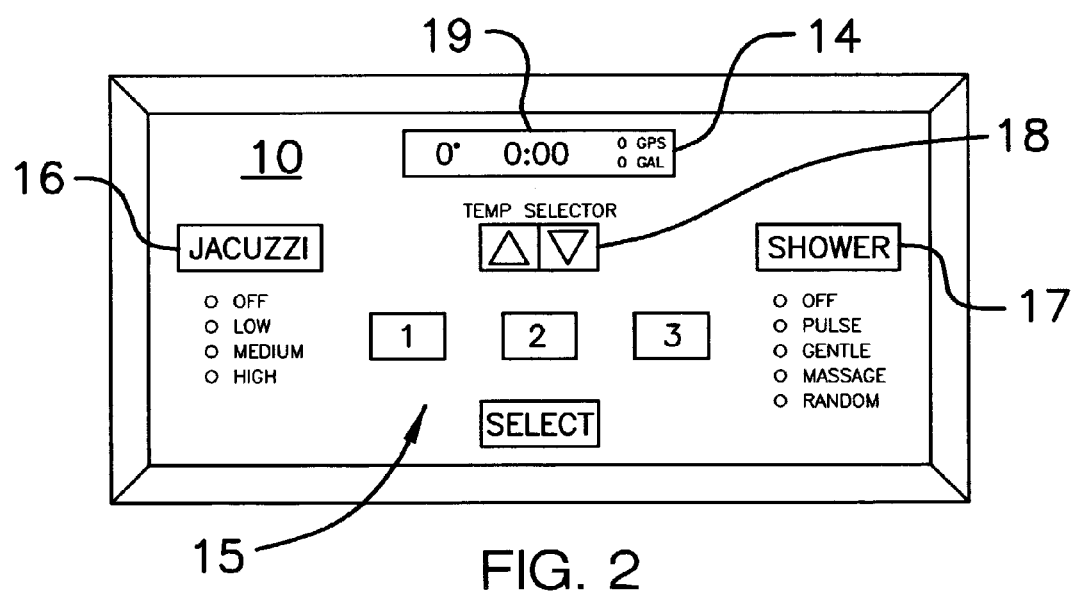
FIG. 2 is an enlarged front view of the control panel shown in FIG. 1.

Now referring to FIG. 2, the control panel 10 is shown as including a display screen 14 for identifying the gallons per second and the gallons of water disbursed via water supply lines to the bathtub 11 or shower head 12. The control panel 10 includes a keypad shown generally at 15 and includes a plurality of buttons 16, 17 and 18 for controlling various parameters of the present invention. For example, selectively pressing the Jacuzzi button 16 adjusts the flow rate of water emitted from the water jets 13 to a desired level. Likewise, selectively pressing the shower button 17 allows a user to adjust the flow rate of water dispersed from the shower head 12 to a desired level.

The control panel 10 preferably includes a microprocessor (not shown) and a memory (not shown) for processing and storing input signals received from the keypad 15, as well known to the person of ordinary skill in the art. Of course, the control panel 10 may include numeric buttons for programming the system 20 to automatically regulate water temperature and pressure at selective times of the day. The control panel 10 is therefore able to continuously monitor system 20 according to programmed settings. A plurality of LEDs preferably indicate the operating modes of the bathtub or Jacuzzi 11 as well as the shower head 12.

As shown on the control panel 10, the jacuzzi water flow rate may be adjusted between off, low, medium and high levels. Also, the temperature selector buttons 18 allow a user to selectively increase or decrease the temperature of the water in the bathtub 11 or shower. The shower button 17 allows a user to selectively operate different modes of the shower head 12. For example, shower head 12 may be programmed to dispense water in a pulse, gentle, massage or random mode.

Figure 3:
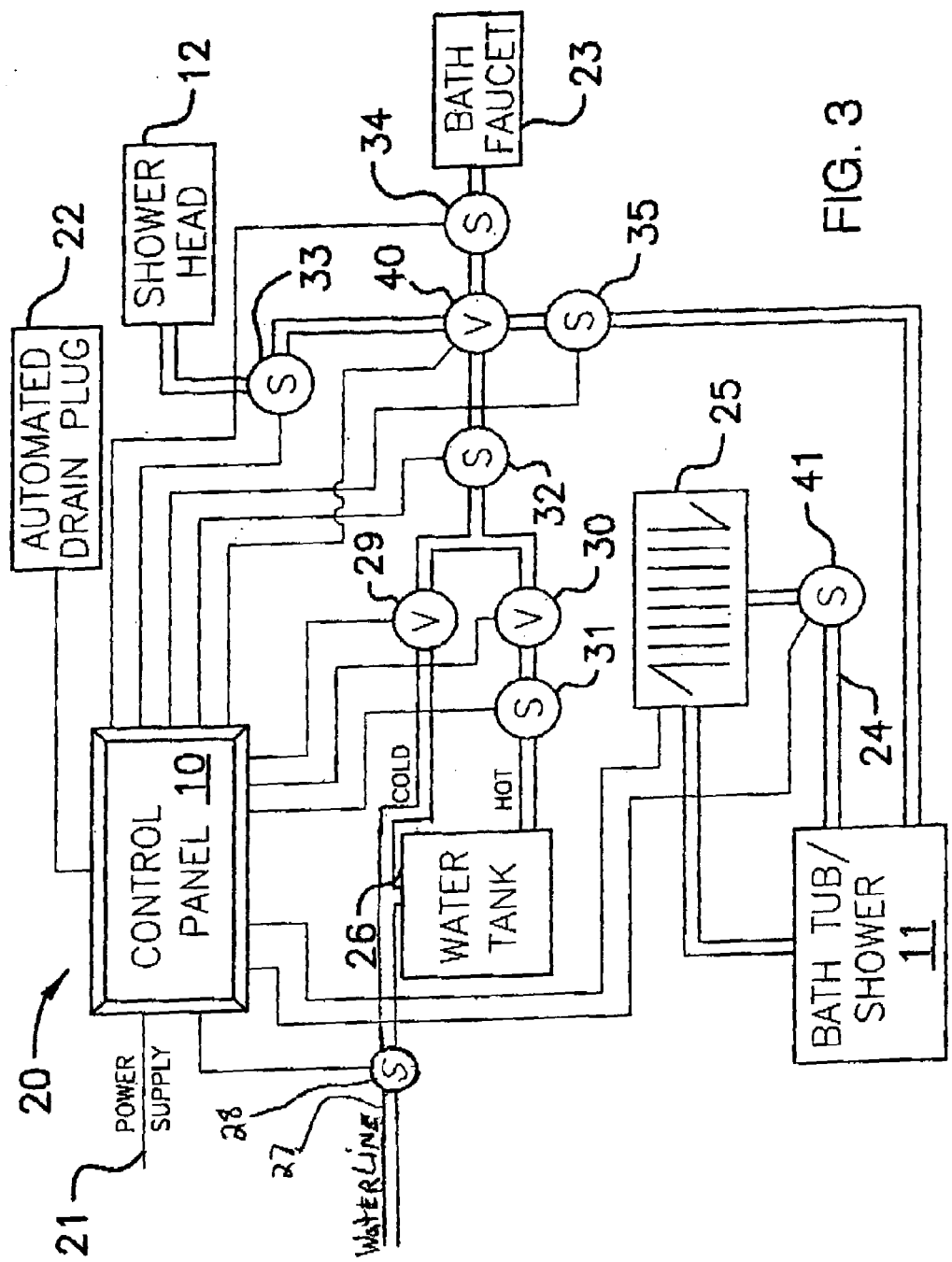
FIG. 3 is a schematic diagram of the bathtub/shower water control system.

Now referring to FIG. 3, a schematic diagram of the water control system 20 of the present invention is shown. In particular, the water control system 20 includes a control panel 10 connected to a power supply line 21. A conventional power supply line may be used as well known in the industry. The water control system 20 further includes a plurality of sensors 28, 31, 32, 33, 34, 35 and 41 for detecting the temperature and flow rate of water being regulated by the system 20. For example, sensor 28 is connected downstream of the water source 27 for determining the initial water temperature and pressure entering into the system 20.

The system 20 further includes a plurality of valves 29, 30 and 40 selectively spaced and connected to the plurality of water lines supplying water to the bathtub 11 and shower head 12. Such valves 29, 30 and 40 are electrically connected to the control panel and receive input signals for either allowing water to flow or preventing water from flowing through the water lines. Likewise, sensors 28, 31, 32, 33, 34, 35 and 41 are selectively connected to the water lines and send output signals to the control panel 10 for indicating the properties of the water traveling through the water lines such as the water temperature and water flow rate or pressure. Based on such signals, the control panel 10 selectively activates the control valves 29, 30 and 40 to provide the desired water temperature and water flow rate as programmed by a user via the keypad 15 on the control panel 10.

The water control system 20 further includes at least one heating device 25 connected downstream of sensor 35. The heating device(s) 25 help maintain the water temperature in the bathtub 11. After the bathtub 11 is filled with a predetermined amount of water via jets 13, the heating device 25 is capable of circulating the water temperature via water jets 42. Advantageously, the water in the bathtub 11 may be circulated via water pipes 24 so that less energy is consumed to heat the bathtub 11 water while taking an extended bath. Of course, the heating device 25 is electrically connected to control panel 10 for receiving output signals therefrom based upon a user-designated signal received from the keypad 15. In particular, the heating device 25 is connected to sensor 41 which will notify the control panel 10 when the water temperature falls outside a desired range.

The water control system 20 further includes an automated drain plug 22 which is electrically connected to the control panel 10. Such an automated drain plug 22 may be selectively operated between a closed position and an open position for regulating the water level inside the bathtub 11. Advantageously, the risk of water overflowing from the bathtub 11 is reduced by automatically operating the drain plug 22 of the bathtub 11. Furthermore, when the water level reaches a desired level, the water supply can be automatically shut off so that a user does not have to continuously monitor the water level in the bathtub 11. Such features allow a user to set the water level and temperature and forget about having to monitor same.

A bath faucet 23 is connected downstream from sensor 34 and may be selectively operated by a user via the control panel 10. Moreover, by programming the control panel 10, the user may designate whether he/she desires water to flow from the shower head 12, the bath faucet 23 or the water jets 13. To accomplish this, a central valve 40 is connected to the water line upstream of the shower head 12, bath faucet 23 and water jets 13. Such a valve 40 is preferably a multi-directional valve as well known in the industry and can be selectively operated by the control panel 10. Thus, a user can program the control panel to allow water to travel through a corresponding water line leading to the desired location such as the shower head 12, bath faucet 23 or bathtub 11.

A first sensor 33, a second sensor 34 and a third sensor 35 provide signals to the control panel 10 for indicating the properties of the water supplied to shower head 12, bath faucet 23 and water jets 13, respectively. In particular, sensor 32 is located downstream of the water tank 26 and also downstream of valves 29, 30 for indicating the water temperature and pressure supplied by the hot water line and the cold water line extending outwardly from water tank 26. Such a water tank is located downstream of sensor 28 and upstream of sensor 32, which notifies the control panel 10 about the water temperature and pressure flowing towards the bath faucet 23, shower head 12 and water jets 13. Furthermore, sensor 31 is located downstream of water tank 26 and sends a signal to control panel 10 for indicating the water temperature flowing through the hot water supply line.

Figure 4:
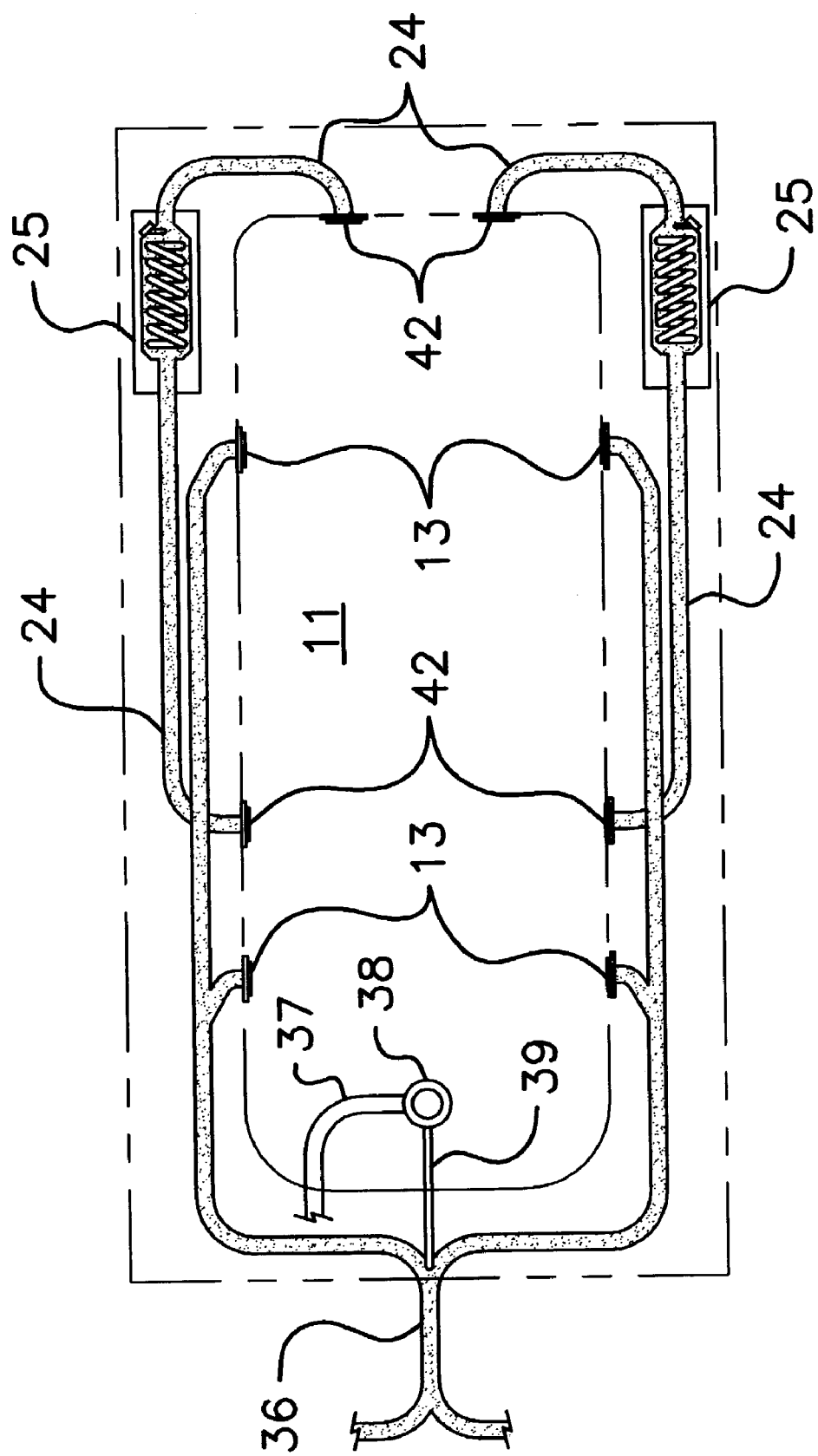
FIG. 4 is top plan view of heating devices fluidly connected to water supply lines, in accordance with the present invention.

Now referring to FIG. 4, the heating devices 25 are shown as being spaced apart and oppositely disposed on either side of the bathtub 11. Each heating device 25 receives water from incoming water lines 24 and regulates the temperature of the water according to a signal received from control panel 10. Likewise, each heating device 25 discharges water via outgoing water lines connected to water jets 42. Advantageously, the present invention is able to circulate bathtub water by regulating water independently from water supply lines 36.

For determining the water level of the bathtub 11, a sensor 39 is connected to the plug 38 and the water supply line 36. The plug 38, of course, directs water through the drain 37 for reducing the water level of the bathtub 11. As noted above, programming the control pad 10 may selectively operate the plug 38.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A water control system for use with a bathtub including a plurality of water dispensers and a plurality of water supply lines, said water control system comprising:

a control panel connected to a power source and being mountable adjacent to the bathtub;

a plurality of sensors connected to said control panel for determining water temperature and water pressure, said plurality of sensors being selectively connected to the plurality of water supply lines, wherein one of said plurality of sensors is located upstream of a water tank, said one sensor providing an input signal to said control panel for indicating water temperature and water pressure, wherein the water tank includes a hot water supply line, a cold water supply line in fluid communication with the bathtub, each of the hot and cold water supply lines having a corresponding one of said plurality of valves connected thereto, and wherein another of said plurality of sensor is connected to the hot water supply line, said another sensor being located downstream of the hot water supply line valve;

a plurality of valves connected to said control panel for regulating water flow, said plurality of valves being selectively connected to the plurality of water supply lines; and a plurality of heating devices fluidly connected to a water source for regulating water temperature, said plurality of heating devices receiving water having a first temperature and delivering water having a second temperature to the bathtub, wherein said plurality of heating devices oppositely located on opposite sides of the bathtub and disposed within circulating pipes for receiving and discharging recycled water in the bathtub so that less energy is consumed to heat the bathtub water;

said control panel being programmable for selectively operating said plurality of valves and said plurality of heating devices; and a central valve located downstream of the water tank and connected to the water supply lines upstream of a shower head, a bath faucet and water jets, said central valve directs water flow to the either the shower head, the bath faucet or water jets and selectively operated by said control panel, a first sensor is positioned between the central valve and the shower head, a second sensor is positioned between the central valve and the bath faucet, and a third sensor is positioned between the central valve and the water jets, wherein said first, second and third sensors provide signals to said control panel for indicating the properties of the water supplied to the shower head, the bath faucet and the water jets, respectively.

2. The water control system of claim 1, further including an automatic drain plug connected to said control panel, said control panel including a keypad for selectively operating said drain plug.

3. The water control system of claim 1, wherein said control panel includes a keypad for selectively controlling water temperature and water pressure being supplied to the bathtub.

4. The water control system of claim 1, wherein said control panel includes a display screen.

5. The water control system of claim 1, wherein said control panel further includes means for selectively programming water temperature and water pressure to a desired level.

6. The water control system of claim 1, wherein said control panel further includes means for automatically regulating water temperature and water pressure.

7. A water control system for use with a bathtub including a plurality of water dispensers and a plurality of water supply lines, said water control system comprising:

a control panel connected to a power source and being mountable adjacent to the bathtub, said control panel including a keypad for receiving a user input;

a plurality of sensors connected to said control panel for determining water temperature and water pressure, said plurality of sensors being selectively connected to the plurality of water supply lines, wherein one of said plurality of sensors is located upstream of a water tank, said one sensor providing an input signal to said control panel for indicating water temperature and water pressure, wherein the water tank includes a hot water supply line, a cold water supply line in fluid communication with the bathtub, each of the hot and cold water supply lines having a corresponding one of said plurality of valves connected thereto, and wherein another of said plurality of sensor is connected to the hot water supply line, said another sensor being located downstream of the hot water supply line valve;

a plurality of valves connected to said control panel for regulating water flow, said plurality of valves being selectively connected to the plurality of water supply lines;

a plurality of heating devices fluidly connected to a water source for regulating water temperature, said plurality of heating devices receiving water having a first temperature and delivering water having a second temperature to the bathtub, wherein said plurality of heating devices oppositely located on opposite sides of the bathtub and disposed within circulating pipes for receiving and discharging recycled water in the bathtub so that less energy is consumed to heat the bathtub water;

said control panel being programmable for selectively operating said plurality of valves and said plurality of heating devices based upon the user inputs; and a central valve located downstream of the water tank and connected to the water supply lines upstream of a shower head, a bath faucet and water jets, said central valve directs water flow to the either the shower head, the bath faucet or water jets and selectively operated by said control panel, a first sensor positioning between the central valve and the shower head, a second sensor positioning between the central valve and the bath faucet, and a third sensor positioning between the central valve and the water jets, wherein said first, second and third sensors provide signals to said control panel for indicating the properties of the water supplied to the shower head, the bath faucet and the water jets, respectively.

8. The water control system of claim 7, further including an automatic drain plug connected to said control panel.

9. The water control system of claim 7, wherein said control panel includes a keypad for selectively controlling water temperature and water pressure being supplied to a bathtub.

\* \* \* \* \*